(12) United States Patent
Mueckner

(10) Patent No.: US 12,488,444 B2
(45) Date of Patent: Dec. 2, 2025

(54) METHOD, SOFTWARE PROGRAM AND SYSTEM FOR DETECTING IMAGE IRREGULARITIES IN VIDEO ENDOSCOPIC INSTRUMENT PRODUCED IMAGES

(71) Applicant: OLYMPUS Winter & Ibe GmbH, Hamburg (DE)

(72) Inventor: Andreas Mueckner, Schwarzenbek (DE)

(73) Assignee: OLYMPUS Winter & Ibe GmbH, Hamburg (DE)

( * ) Notice: Subject to any disclaimer, the term of this patent is extended or adjusted under 35 U.S.C. 154(b) by 338 days.

(21) Appl. No.: 18/138,212

(22) Filed: Apr. 24, 2023

(65) Prior Publication Data

US 2023/0342901 A1    Oct. 26, 2023

Related U.S. Application Data

(60) Provisional application No. 63/334,749, filed on Apr. 26, 2022.

(51) Int. Cl.
*G06T 7/00* (2017.01)

(52) U.S. Cl.
CPC .. *G06T 7/0002* (2013.01); *G06T 2207/10068* (2013.01); *G06T 2207/20084* (2013.01)

(58) Field of Classification Search
CPC ......... G06T 7/0002; G06T 2207/10068; G06T 2207/20084; G06T 2207/10016; G06T 2207/10024

See application file for complete search history.

(56) References Cited

U.S. PATENT DOCUMENTS

| | | | |
|---|---|---|---|
| 11,037,295 B2 * | 6/2021 | Armaitis | G06T 7/11 |
| 11,607,114 B2 * | 3/2023 | Tsuyuki | A61B 1/051 |
| 12,154,680 B2 * | 11/2024 | Qiu | G06V 10/945 |
| 2012/0320340 A1 * | 12/2012 | Coleman, III | A61B 3/10 351/208 |
| 2019/0311475 A1 * | 10/2019 | Hosoi | G06N 3/08 |
| 2020/0405134 A1 * | 12/2020 | Hameed | A61B 1/00029 |

(Continued)

FOREIGN PATENT DOCUMENTS

| | | |
|---|---|---|
| DE | 197 26 877 A1 | 1/1999 |
| DE | 10 2011 106 386 A1 | 1/2013 |
| DE | 10 2016 113 000 A1 | 1/2018 |

OTHER PUBLICATIONS

Ali, S., et al., "A deep learning framework for quality assessment and restoration in video endoscopy", Medical Image Analysis 68, 2021 101900.

(Continued)

*Primary Examiner* — Wesley J Tucker
(74) *Attorney, Agent, or Firm* — Scully, Scott, Murphy & Presser, P.C.

(57) ABSTRACT

A method for detecting an image irregularity in one or more still images or video images produced by an endoscopic instrument. The method including: producing the one or more still images or video images; transmitting the one or more still images or video images to a processor comprising hardware; detecting, with the processor, a presence or an absence of the image irregularity in the one or more still images or video images; and where the presence of the image irregularity is detected, issuing a notification to a user about the presence of the image irregularity.

17 Claims, 3 Drawing Sheets

(56) References Cited

U.S. PATENT DOCUMENTS

| | | | | |
|---|---|---|---|---|
| 2021/0151174 | A1* | 5/2021 | Cousin | G06Q 30/0185 |
| 2022/0101525 | A1* | 3/2022 | Souchaud | G06N 3/08 |
| 2022/0148145 | A1* | 5/2022 | Schiltz | G01N 21/8806 |
| 2022/0207728 | A1* | 6/2022 | Rittscher | G06T 7/0012 |
| 2023/0215003 | A1* | 7/2023 | Tsujimoto | G06N 3/045 |
| | | | | 382/128 |
| 2023/0222666 | A1* | 7/2023 | Takenouchi | G16H 30/40 |

OTHER PUBLICATIONS

Nishitha, R., et al. "Image Quality Assessment for Endoscopy Applications", 2021 IEEE International Symposium on Medical Measurements and Applications.

Noordmans, H.J., et al., "Optical quality assessment of rigid endoscopes during clinical lifetime", Proc. SPIE 6082, Endoscopic Microscopy, 60820H, Feb. 23, 2006; doi: 10.1117/12.648497.

* cited by examiner

Fig. 1
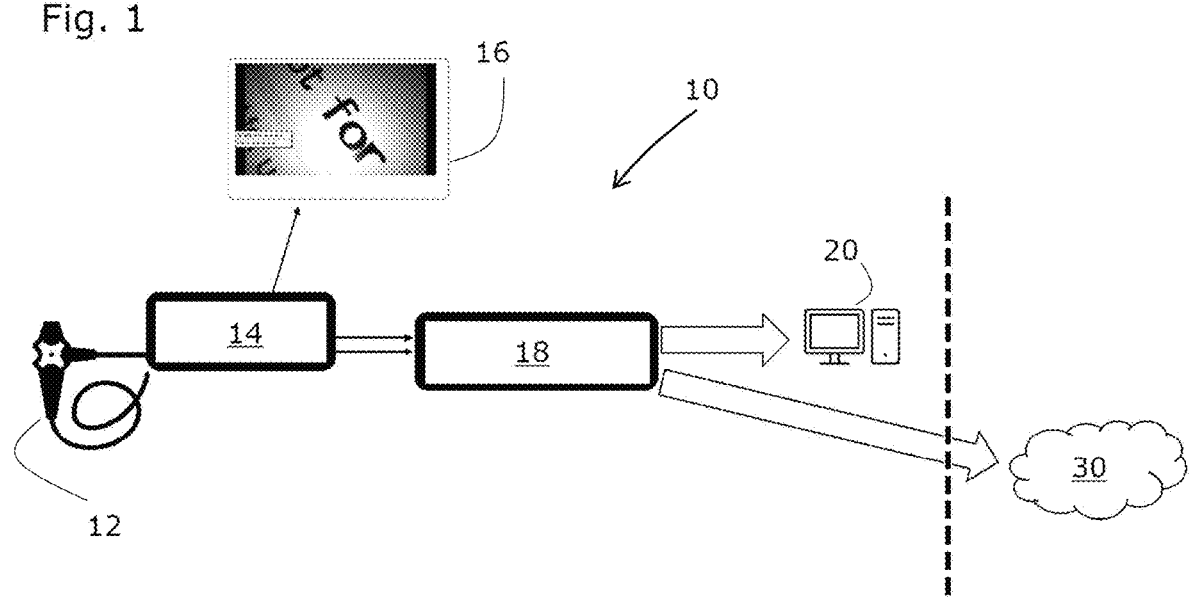
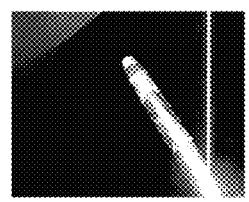
Fig. 2A
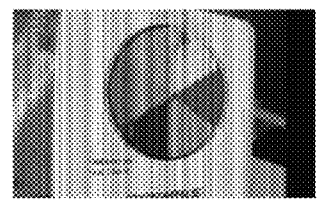
Fig. 2B
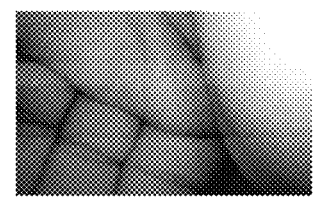
Fig. 2C

| Irregularity Detected | Severity/Intensity/Persistence | Warning |
|---|---|---|
| Smear | Mild | Manual Cleaning |
| Smear | Medium to Severe | Reprocessing |
| Smear | Persistent | Repair or Replace |
| Vertical Stripes | Mild to Medium | Repair |
| Vertical Stripes | Severe and/or Persistent | Replace |
| Horizontal Stripes | Mild to Medium | Repair |
| Horizontal Stripes | Severe and/or persistent | Replace |

METHOD, SOFTWARE PROGRAM AND SYSTEM FOR DETECTING IMAGE IRREGULARITIES IN VIDEO ENDOSCOPIC INSTRUMENT PRODUCED IMAGES

CROSS-REFERENCE TO RELATED APPLICATION

The present application is based upon and claims the benefit of priority from U.S. Provisional Application No. 63/334,749 filed on Apr. 26, 2022, the entire contents of which is incorporated herein by reference.

BACKGROUND

Field

The present disclosure concerns a method, a software program and a system for detecting image irregularities in video endoscopic instrument produced images.

Prior Art

The images of video endoscopes can suffer under various defects, which may have optical reasons, such as smears on the lens or lens defects, or electrical defects in the image sensor leading to various irregularities such as defective pixels, vertical or horizontal flickering strips or differently colored strips, color tinges and many more. Some of these irregularities may be corrected by cleaning and reprocessing, such as smears on the entrance lens. However, for most other mechanical, internal or electrical defects leading to image irregularities the video endoscope will have to be sent to repair.

Usually, if a video endoscope has a defect that is readily visible in the video image, this defect will eventually be detected by the user and then reported. However, there are defects that are not immediately perceived as such by the user. In such cases, there is no guarantee that this endoscope will be sent for repair on a timely basis. It may instead be reprocessed and used in further procedures. The quality of the examinations may be negatively affected by such non-obvious image irregularities.

Currently there is no technical solution that is able to detect a defect in endoscope images in real-time, such as a solution that is implemented in an image processor, such as when it comes to defects that only manifest themselves through slight irregularities in the image.

SUMMARY

An object of the present disclosure is to present a remedy to the above-described problem.

Such object can be achieved by a method for detecting image irregularities in video endoscopic instrument produced images, wherein an image processor of a video endoscopic instrument produces one or more video endoscopic still or video images and transmits the one or more video endoscopic still or video images to an evaluation unit, such as a processor, the evaluation unit evaluates the one or more video endoscopic still or video images for the presence or absence of image irregularities and in the case of detection of the presence of an image irregularity, issues a notification about the presence of the image irregularity.

The presently disclosed method can provide the functionality of the detection of image irregularities in the direct chain of image generation and image processing, thus making it possible to provide image irregularity detection in real-time, is in addition to the conventional real-time uses of video endoscopic images during procedures, such as displaying the images to the operator or performing image analysis for the purpose of supporting the procedure.

In embodiments, a detection of the absence or presence of image irregularities in the one or more video endoscopic still or video images can comprise carrying out conventional image processing in the evaluation unit. Such conventional image processing may include a color tinge analysis of images with neutral color settings and supposedly proper white balance, or the analysis of irregular pixels, pixel clusters, rows or columns of pixels, whose signals consistently or intermittently deviate strongly from those of the surrounding pixels. This deviation may be evaluated using a threshold for the signal difference of the afflicted pixel or pixels with respect to the signals surrounding pixels, e.g., a mean value thereof, or other metrics that indicate irregular pixels.

In embodiments, the one or more video endoscopic still or video images can be additionally fed to a convolutional neural network (CNN) in the evaluation unit, the CNN having been trained for the detection of image irregularities in video endoscopic images, wherein the CNN performs a detection and classification of image irregularities in the one or more video endoscopic still or video images. The application of machine learning and trained CNNs can make it possible to perform real-time detection and classification of image irregularities. Notwithstanding the possibility of real-time detection, an offline detection of image irregularities in the stored video endoscopic imagery can also be possible.

The training of such CNNs can be carried out with a training image dataset of video endoscopic still or video training images featuring various image irregularities of known types and locations that are labelled with a classifier indicating the class of the respective image irregularity, and an indication of the location of the image irregularity, if applicable, feature extraction and/or fine tuning can be used. Feature extraction and fine-tuning are well-established methods in the training of CNNs. Both start from a pre-trained CNN, where both the layers of the convolutional base and the layers of the classifier have been trained on a large image dataset. In feature extraction, the convolutional base can be left in place, whereas the classifier is retrained with the new training image dataset and labels. In fine-tuning, is a few of the topmost layers, i.e., on the output side, of the convolutional base can be retrained along with the classifier portion of the CNN. Other suitable training methods may be used in this context as well.

The location of the image irregularity can be relevant if the image irregularity is of limited extent in the training image. The training image dataset may comprise a plurality of training images for each class of image irregularity, wherein within each set of class-specific training images, the training images display a variety of video endoscopic scenes and backgrounds, and a variety of locations of the respective same-class image irregularities within the training images, thus avoiding biasing the CNN for specific scenes or locations within the images in which such image irregularities will occur.

The location may be omitted, or the entirety of the image may be indicated as a location of an image irregularity, if the image irregularity affects the entirety of the image. This may be the case, e.g., when the image irregularity is a color tinge, e.g., a general enhancement of the green channel signal in images that are supposed to have proper white balance and neutral color settings.

In embodiments, the issuing of a notification about the presence of the image irregularity can involve optically or acoustically signalling to the operator, or logging in a clinical endoscopic reprocessing system that notifies a person charged with supervising the reprocessing of the video endoscopic instrument, and/or the reprocessing system itself, and/or in a locally installed or cloud-based supervisory system. The supervisory system may be configured to trigger redemptory actions for the afflicted video endoscopic instrument, such as repair, replacement, among others.

In embodiments, the method can include taking out a video endoscopic instrument having an image irregularity from normal operation and sending the video endoscopic instrument for repair.

In further embodiments, the method can include automatically ordering a replacement video endoscopic instrument upon detection of an image irregularity.

The notification may include at least one of a location of an irregularity, a classification of an irregularity and a prompt for further action, the prompt depending on the classification of the irregularity. In the latter case, the evaluation unit may have a database of specific actions to be taken in response to the specific class of image irregularity found. In case of a smear, a simple reprocessing might suffice. In case of lens defects, a check and repair of the optical system may be advised, whereas in case of electronic defects, the image sensor or its readout electronics may have to be checked and repaired or possibly replaced.

In another aspect of the present disclosure, such object can be achieved by a computer readable medium having a software program with program code means stored thereon, configured to carry out detection of image irregularities in one or more video endoscopic still or video images when running on an evaluation unit. By this, the computer readable medium of the present disclosure can be configured to implement the image irregularity detection of the above-described method. The computer readable medium may include program code means for at least one of conventional image processing and CNN based image irregularity detection, as well as for issuing a notification for image irregularities.

The computer readable medium can embody the same advantages, characteristics and features as the previously described method.

In a further aspect of the present disclosure, such object can also be achieved by a system for detecting image irregularities in video endoscopic instrument produced images, comprising at least one video endoscopic instrument, an image processor equipped to receive image signals from the video endoscopic instrument and providing video endoscopic images therefrom, a display device with a screen equipped to receive video endoscopic images from the image processor and to display the video endoscopic images on the screen, an evaluation unit configured to receive video endoscopic images from the image processor and perform a detection of image irregularities therein according to the above-described method. Such system can embody the same advantages, characteristics and features as the previously described method.

The evaluation unit may be implemented in the image processor as only hardware or as a combination of hardware and a software , or as a separate computing device (processor) as only hardware or as a combination of hardware and a software for detecting image irregularities in video endoscopic still or video images, the separate computing device being connected to the image processor to receive video endoscopic images provided by the image processor or otherwise receive such video endoscope images.

The system may comprise at least one of a reprocessing device for the at least one video endoscopic instrument and a connection to a supervisory system, such as a local supervisory system or a cloud-based supervisory system. The reprocessing device may be directly advised of the need for reprocessing or repair of the video endoscopic instrument. The supervisory system may be implemented to keep track of image irregularities in a plurality of video endoscopic instruments. It may also be used to further train the CNN with real-life images having image irregularities that have either been overlooked by the automatic image irregularity detection or wherein existing image irregularities have been misclassified.

A supervisory system may be set up locally or cloud-based.

BRIEF DESCRIPTION OF THE DRAWINGS

Further characteristics will become apparent from the description of the embodiments together with the claims and the included drawings. Embodiments can fulfill individual characteristics or a combination of several characteristics.

The embodiments are described below, without restricting the general intent of the invention, based on exemplary embodiments, wherein reference is made expressly to the drawings with regard to the disclosure of all details that are not explained in greater detail in the text. In the drawings:

FIG. 1 illustrates an exemplary embodiment of a system according to the present disclosure, FIG. 2A illustrates a first example of a video endoscopic image with an image irregularity, FIG. 2B illustrates a second example of a video endoscopic image with an image irregularity, FIG. 2C illustrates a third example of a video endoscopic image with an image irregularity.

DETAILED DESCRIPTION

Figure 3A:
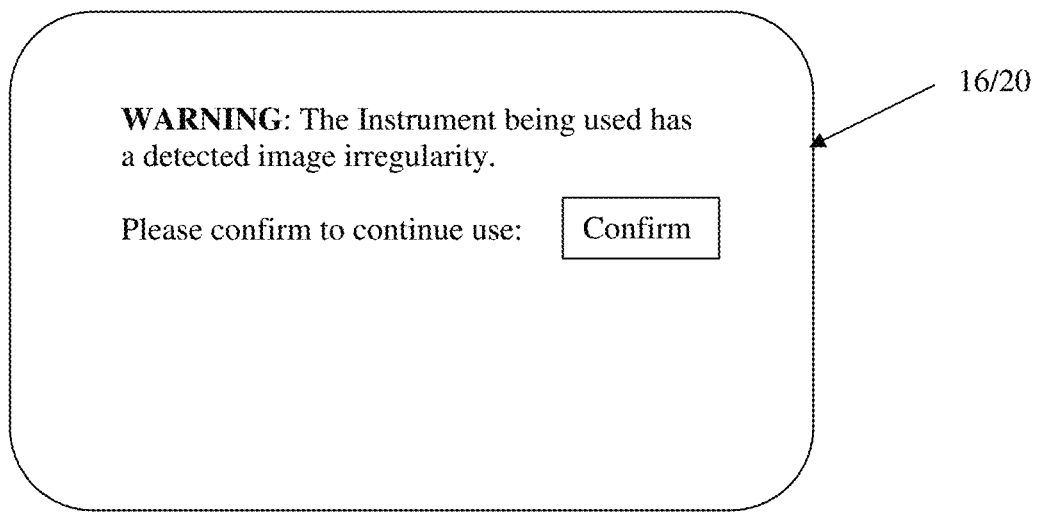
FIGS. 3A and 3B illustrate exemplary warnings for display on a display/monitor.

FIG. 1 shows an exemplary embodiment of the system 10 according to the present disclosure, comprising a video endoscopic instrument 12 connected to an image processor 14 that may also be part of the video endoscopic instrument 12. The image processor 14 receives image signal data from the image sensor of the video endoscopic instrument 12 and processes the image signal data to produce video endoscopic images. Such image processing may comprise contrast enhancement, automatic adjustment of brightness, white balancing, noise reduction and other conventional image processing functions. It may also overlay or complement the image captured by the video endoscopic instrument with further information about the instrument, instrumental settings, information concerning the procedure currently in progress, among others.

The video endoscopic images produced by the image processor 14 are transferred to a display device 16 with a screen on which the video endoscopic images are displayed to a user, for example the operator.

The image processor 14 is also connected with an evaluation unit (a processor comprising hardware) 18 and transmits both image data as well as other data to the evaluation unit 18. The evaluation unit 18 may be implemented in the image processor 14, as a standalone computing device or as part of another system. By way of example, a component such as a Raspberry Pi (e.g., a small single board computer) with a standard frame grabber and software to implement image irregularity detection may serve as an evaluation unit 18.

The evaluation unit 18 performs an image analysis with the purpose of detecting image irregularities within the video endoscopic images transferred by the image processor 14. For this purpose, the evaluation unit may run traditional image analysis tools or artificial intelligence-based tools such as a CNN trained for the image irregularities in video endoscopic images. A CNN is a class of artificial neural network (ANN) that is well-known for use in analyzing visual imagery.

Once an image irregularity is detected in the evaluation unit 18, a supervisory system 20 situated locally or a cloud-based supervisory system 30 may be notified of the presence of an image irregularity and the need for action with respect to the video endoscopic instrument 12, such as reprocessing, further study or repair. In case of image irregularities of the classification that signals the need for repair, replacement video endoscopic instrument may be ordered from stock.

A notification may also be displayed to the operator by way of the display device 16. The notification may be implemented such that the operator is required to acknowledge the notification before being able to proceed with the procedure. This notification may be accompanied by a recommendation that the video endoscopic instruments 12 has to be reprocessed, studied or repaired.

Figure 3B:
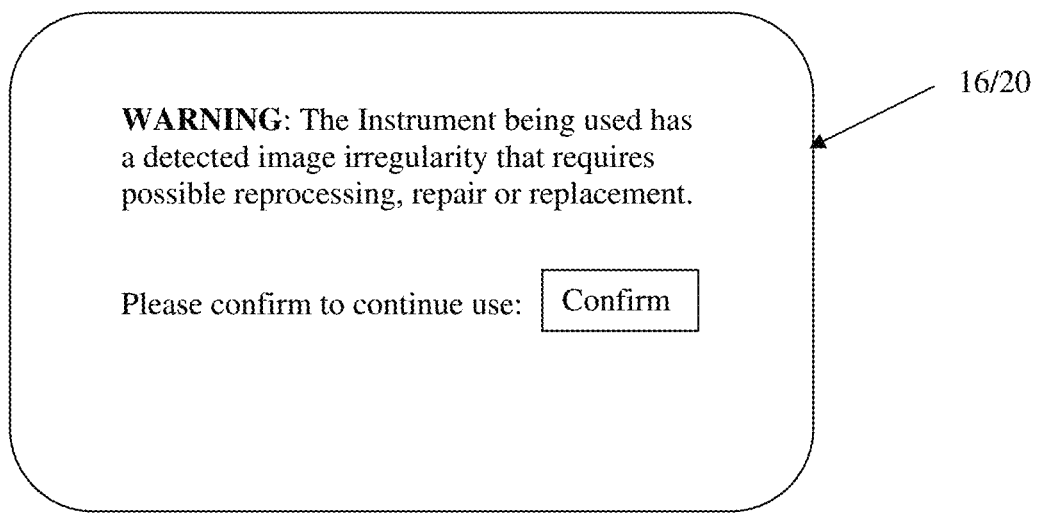

The determination that a corrective action is required due to detection of the presence of an image irregularity can be carried out with conventional software or machine learning. The basic action of notification of the user may be done in one of several ways, such as an acoustic notification by signal or recorded or synthesized speech (through a speaker integral with the display 16/20 or workstation attached thereto), or optical notification by warning light or text display. Examples of such a warning using the display 16/20 is shown in FIGS. 3A and 3B. The text display may be accompanied by a request to acknowledge the notification before the notification is ended, as shown in FIGS. 3A and 3B. In more severe cases, an acknowledgement may not suffice for further use of the instrument, and the instrument must be reprocessed or repaired before use is again permitted.

The criteria for making the determination that a corrective action is required may fall into various categories, such as severity or intensity, a likely negative impact on procedures, a criticality of affected subsystem for safe operation and so on, or persistence, if the irregularity is not removed by previously taken measures such as reprocessing. For example, a smear on the lens is less dangerous than a faulty electronic connection and requires little action other than cleaning or reprocessing. Smears or other artefacts in the image may show up with varying intensity, from not or hardly noticeable with the naked eye all the way to impeding the imaging to such a degree that details of the image cannot be discerned anymore. A persistent smear may be located on an internal optical surface that cannot be reached through manual cleaning or reprocessing. This would mean that the endoscope needs to be opened and the affected optical element either cleaned separately or replaced. Various irregularities will mean different recommended courses of action, which in addition may depend on the intensity or severity of the specific irregularity.

A lookup-table or a decision tree set in software can be used for such determination, where standard image processing and analysis are used to identify various kinds of irregularities and their severity/intensity/persistence by conventional means. An exemplary lookup table may be of the type illustrated in FIG. 4.

Alternatively, a CNN or other Machine Learning model could be used that has been trained with a large host of pre-categorized images, both containing a variety of such irregularities in various degrees of intensity or severity (including the threshold of being visible with the naked eye) and containing no irregularities.

The persistence of an irregularity may be established by keeping a log of detected irregularities in a database and comparing an irregularity found during use of the endoscope with previously found irregularities and noting that remedying actions such as reprocessing have taken place in the meantime.

A notification may also be logged such that the supervisory system 20, 30 is notified via log file. A reprocessing device may also be supplied with a log file or directly with the notification so that either the appropriate reprocessing steps can be carried out to remedy the cause of the specific type of image irregularity, or the person entrusted with the reprocessing is informed of further need of evaluation and possibly repair.

FIGS. 2A through 2C show three different kinds of image irregularities that have progressed to the point or of the type where they are easily visible to a user.

In FIG. 2A, the tip of a metallic endoscopic instrument is visible before a dark background. In the lower right corner of the image, the contrast is decreased and the white of the light reflecting from the instrument is smeared out over the adjacent area. This kind of image irregularity stems from smearing on the outer surface of the entry lens of the video endoscopic instrument. The outer lengths may have been touched by an unprotected fingertip, leaving residue on a small part of the entry lens. This kind of image irregularity therefore indicates the need for reprocessing, especially of cleaning the entry lens of the video endoscopic instrument 12.

The smearing in the lower right part of the image displayed in FIG. 2A is quite pronounced and visible for the naked eye in order to make the irregularity plainly visible for the demonstration. The smearing may also be much less pronounced and therefore escape the naked eye of the operator although it might still lead to inferior quality images in need of remedy.

Smears can be addressed by manual cleaning or reprocessing in most cases, since the smearing typically occurs on an exterior optical surface of the endoscope, such as the front window of the endoscope. However, as discussed above, there may be a smear on an optical surface inside the hermetically sealed interior of the endoscope (meaning that the endoscope is no longer hermetically sealed). In that case, reprocessing will not resolve the smear and the smear will persist in the imagery. Such internal smear is a sign of a more severe problem with the endoscope indicating that a repair is necessary.

Furthermore, there is a white vertical line in the right part of the image. This white line originates in the brightest part of the reflection of the illumination light from the metal tip part of the endoscopic instrument shown in FIG. 2A. The brightness in that part of the image exceeds the dynamic range of the image sensor, prompting a bleeding off of charge into the pixels of the afflicted columns. The reason may be an involuntary grounding of a Vsub connector of the image sensor, e.g. because of a break in the substrate at the image sensor. This type of image irregularity necessitates a repair.

FIG. 2B shows an image with vertical stripes that are each one pixel or a few pixels wide, respectively. In the RGB original, the vertical stripes have different colors. This type of image irregularity is quite obvious and may indicate a problem with a broken signal cable.

FIG. 2C shows an image with horizontal stripes that are quite broad within the image and that occur intermittently. This type of irregularity may be indicative of problems with a CCU plug that will have to be replaced.

The vertical and horizontal stripes illustrated in FIGS. 2B and 2C, respectively, are likely to result from internal electrical issues. As such, they are not likely to be corrected with reprocessing, therefore, the endoscope will have to be repaired or, in severe or persistent cases, replaced.

The irregularities displayed in FIG. 2A-C are of such intensity that they are easily recognizable with the naked eye for illustrative purposes. Earlier detection of such errors using system 10 could provide improved diagnostics during earlier procedures in which such irregularities are not yet perceptible to the user. Furthermore, the present problem is a matter of degree and system 10 can be useful even where such irregularities are visible to the naked eye. The human brain is susceptible to a loss of perception of irregularities even when they are visibly present. Even if one sees an irregularity at first, the brain will get accustomed to the irregularity if it is not too glaring and after a while no longer perceive it. The system 10 can prevent such situations from the start by using image processing and analysis, by conventional means or by Machine Learning models, to identify instrumental problems causing image irregularities at a stage even before they are visible with the naked eye or are of such low intensity as to be susceptible to loss of subjective perception by a surgeon. And although the naked eye is quite good, automated image analysis suffers no such getting used effect.

The examples shown in FIGS. 2B and 2C of the present application are of a nature that would be easily recognizable by conventional image analysis tools, even at lower severity, since they display very distinctive steps in brightness or color when summed up over rows and columns of pixels, respectively, indicating an electronic problem. With decreasing intensity of such irregularities, they might escape the notice of the surgeon, but they would still be recognizable by system 10.

In the example shown in FIG. 2A, the smearing would be recognizable through a persistent loss in (range of) contrast in the area of the image affected by the smear. This is a kind of irregularity that by its very nature is not so easily recognized with the naked eye except in extreme cases such as in FIG. 2A, whereas the automated image analysis of system 10 has no problem in identifying such irregularities even at much lower intensities of the irregularity. Endoscopic images can be taken as video streams, and the area of reduced (range of) contrast would show up consistently in the same spot of the image, regardless of the real image displayed at any given moment.

Figures 4, 5:
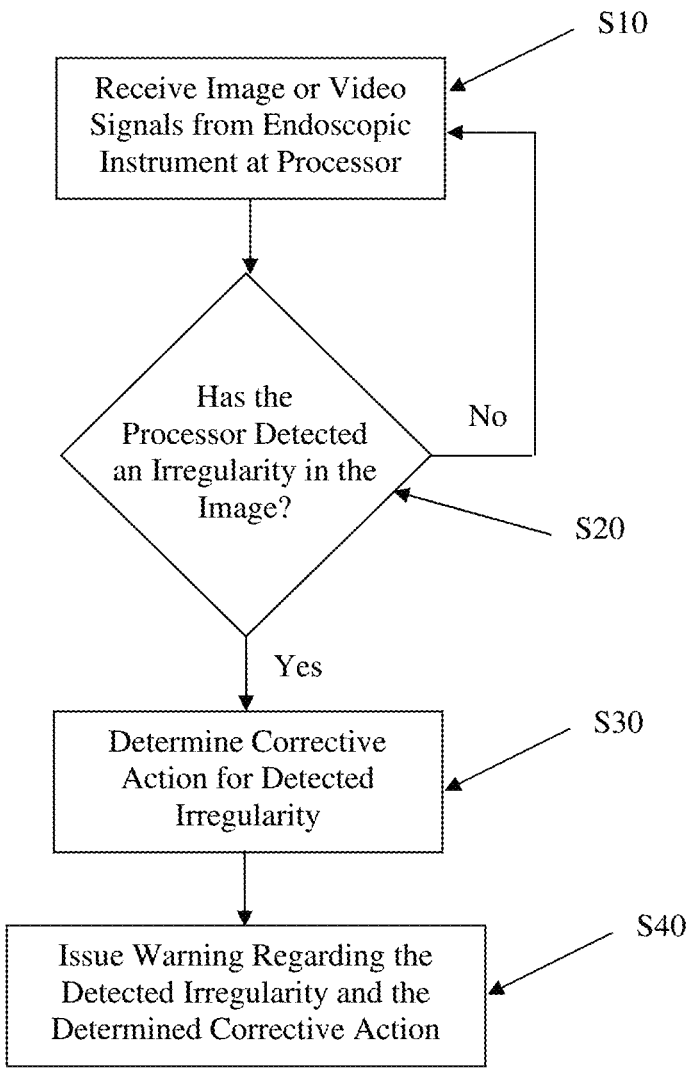
FIG. 4 illustrates an exemplary look-up table for determining an appropriate warning to display.
FIG. 5 illustrates an exemplary flow chart of a method for issuing a warning based on a detected irregularity.

Turning next to FIG. 4, there is illustrated a flow chart outlining steps performed in a method for detecting an image irregularity in one or more still images or video images produced by an endoscopic instrument. Such method includes the step of receiving the one or more still images or video images produced by an endoscopic instrument at S10.

At step S20 the processor determines, as discussed above, whether an irregularity has been detected. If not, the method loops back to step S10 until an irregularity is detected at step S20, at which point the method advances to step S30 where the processor determines, as discussed above, a corrective action for the detected irregularity. At step S40, the processor issues a warning, as discussed above, regarding the detected irregularity and the determined corrective action.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCES 10 system
12 video endoscopic instrument
14 image processor
16 display device
18 evaluation unit
20 supervisory system
30 cloud-based supervisory system

What is claimed is:

1. A method for detecting an image irregularity in one or more images produced by an endoscopic instrument, the method comprising:
    receiving, by a processor, the one or more images from the endoscopic instrument during an operation using the endoscope instrument, wherein the one or more images are produced by the endoscopic instrument during the operation using the endoscope instrument;
    detecting, with the processor, a presence or an absence of the image irregularity in the one or more images; and
    when the presence of the image irregularity is detected:
        classifying, by the processor, the detected image irregularity into a type of defect of the endoscope instrument, wherein the type of defect includes one of mechanical, internal and electronic defects of the endoscope instrument; and
        issuing, by the processor, a notification to a display, wherein the notification indicates the presence of the image irregularity in the one or more images and a prompt for a corrective action to address the classified type of defect of the endoscope instrument.

2. The method according to claim 1, wherein detecting the presence of the image irregularity comprises performing, by the processor, image processing on the one or more images.

3. The method according to claim 2, wherein the image processing includes at least one of:
    a color tinge analysis of images with neutral color settings and proper white balance;
    an analysis of irregular pixels, pixel clusters, rows or columns of pixels in the one or more images, and pixels that deviate from surrounding pixels; and
    an analysis of smearing in the one or more images.

4. The method according to claim 2, wherein detecting the absence or the presence of the image irregularity and the classifying comprise inputting the one or more images to a convolutional neural network (CNN) to the processor, the CNN being trained for the detection of the image irregularity in endoscopic images, and the CNN performing a detection and the classification of the detected image irregularity in the one or more images.

5. The method according to claim 4, wherein the training of the CNN comprises a training image dataset of still training images or video training images featuring various image irregularities of known types and locations that are labelled with a classifier indicating one or more of the class of the respective image irregularity and an indication of the location of the image irregularity.

6. The method according to claim 5, wherein the indication of the location of the image irregularity comprises one or more of feature extraction and fine tuning.

7. The method according to claim 1, wherein the issuing of a notification about the presence of the image irregularity comprises optically or acoustically signalling to a user of the endoscope instrument.

8. The method according to claim 1, wherein issuing the notification comprises one or more of:
    logging in to a clinical endoscopic reprocessing system that notifies a user charged with supervising one or more of the reprocessing of the endoscopic instrument and the reprocessing system itself; and
    logging in to a locally installed or cloud-based supervisory system that notifies the user charged with supervising the reprocessing of the endoscopic instrument.

9. The method according to claim 1, further comprising:
    subsequent to the issuing, determining that the determined image irregularity requires repair of the endoscope instrument; and
    issuing the notification to include a recommendation in the prompt to remove the endoscopic instrument having the image irregularity from normal operation and sending the endoscopic instrument for the repair.

10. The method according to claim 1, wherein the notification further includes at least one of a location of the image irregularity, a classification of the image irregularity.

11. The method according to claim 1, further comprising subsequent to the issuing, automatically ordering a replacement endoscopic instrument upon detection of the image irregularity.

12. A non-transitory computer-readable storage medium storing instructions that cause a computer to at least perform:
    receiving one or more images from an endoscopic instrument during an operation using the endoscope instrument, wherein the one or more images are produced by the endoscopic instrument during the operation using the endoscope instrument;
    detecting a presence or an absence of an image irregularity in the one or more images; and
    when the presence of the image irregularity is detected:
        classifying, by the processor, the detected image irregularity into a type of defect of the endoscope instrument, wherein the type of defect includes one of mechanical, internal and electronic defects of the endoscope instrument; and
        issuing, by the processor, a notification to a display, wherein the notification indicates the presence of the image irregularity in the one or more images and a prompt for a corrective action to address the classified type of defect of the endoscope instrument.

13. The computer-readable storage medium according to claim 12, wherein the instructions cause the computer to detect and classify the presence of image irregularity by performing including instructions for at least one of image processing and inputting the one or more images to a convolutional neural network (CNN).

14. A system for detecting an image irregularity in one or more images produced by an endoscopic instrument, the system comprising:
    at least one endoscopic instrument configured to capture the one or more images;
    a display having a screen, the display being configured to display the one or more images on the screen; and
    one or more processors comprising hardware, the one or more processors being configured to:
        receive image signals corresponding to the one or more images from the endoscopic instrument captured by the endoscopic instrument during an operation using the endoscope instrument;
        provide the image signals corresponding to one or more images to the display to display the one or more images,
        detect a presence or an absence of the image irregularity in the one or more images; and
        when the presence of the image irregularity is detected:
        classify the detected image irregularity into a type of defect of the endoscope instrument, wherein the type of defect includes one of mechanical, internal and electronic defects of the endoscope instrument; and
        issue a notification to the display, wherein the notification indicates the presence of the image irregularity in the one or more images and a prompt for a corrective action to address the classified type of defect of the endoscope instrument.

15. The system of claim 14, wherein the one or more processors comprise:
    an image processor configured to receive the image signals corresponding to the one or more images from the endoscopic instrument and provide the image signals to display; and
    an evaluation processor configured to receive the image signals from the image processor, detect the presence or the absence of the image irregularity in the one or more images and, when the presence of the image irregularity is detected, issuing the notification to the display,
    wherein the image processor is further configured to transmit the image signals to the evaluation processor.

16. The system of claim 14, further comprising at least one of a reprocessing device for the at least one endoscopic instrument and a connection to a supervisory system.

17. The system of claim 16, wherein the supervisory system is one of a local supervisory system or a cloud-based supervisory system.

* * * * *